United States Patent [19]

Dijon et al.

[11] Patent Number: 4,902,106
[45] Date of Patent: Feb. 20, 1990

[54] BISTABLE FERROELECTRIC SMECTIC LIQUID CRYSTAL DISPLAY DEVICE HAVING PARTICULAR ORIENTATION FILM

[75] Inventors: Jean Dijon; Christine Ebel, both of Grenoble, France

[73] Assignee: Commissariat a l'Energie Atomique, Paris, France

[21] Appl. No.: 175,296

[22] Filed: Mar. 30, 1988

[30] Foreign Application Priority Data

Apr. 10, 1987 [FR] France .................. 87 05134

[51] Int. Cl.⁴ .................................. G02F 1/13
[52] U.S. Cl. .................... 350/350 S; 350/341
[58] Field of Search .............. 350/340, 341, 350 S

[56] References Cited

U.S. PATENT DOCUMENTS 4,563,059 1/1986 Clark et al. .................. 350/330

FOREIGN PATENT DOCUMENTS 0032362 7/1981 European Pat. Off. .
0168242 1/1986 European Pat. Off. .
0184487 6/1986 European Pat. Off. .
0203569 12/1986 European Pat. Off. .
86/06506 11/1986 World Int. Prop. O. .

Primary Examiner—Andrew J. James
Assistant Examiner—Richard Gallivan
Attorney, Agent, or Firm—Oblon, Spivak, McClelland, Maier & Neustadt

[57] ABSTRACT

Bistable ferroelectric smectic liquid crystal display device.

This device comprises a tight cell inserted between two polarizers formed from two glass walls, each provided with a display-appropriate electrode connected to an electric power supply for applying an electric field for controlling the liquid crystal to a chiral ferroelectric smectic liquid crystal film inserted between the electrodes. To obtain bistability and storage of the liquid crystal, one of the walls is covered with a material constituted by a stack of a silica layer, a polyimide layer, an optionally rubbed organosilane film in contact with the liquid crystal and the other wall is provided with a silica film covered with a Nylon film.

36 Claims, 4 Drawing Sheets

BISTABLE FERROELECTRIC SMECTIC LIQUID CRYSTAL DISPLAY DEVICE HAVING PARTICULAR ORIENTATION FILM

The present invention relates to a ferroelectric liquid crystal display device having a chiral smectic phase. It is used in optoelectronics and more particularly in the binary display of complex or analog images or pictures or in the display of alphanumeric characters.

Although the invention is applicable to all smectic chiral liquid crystals tilted H, G, F, I, C, it more particularly relates to chiral smectic C phase liquid crystals.

BACKGROUND OF THE INVENTION

No. EP-A-0 032 362 describes a display device, whose electrooptical display material is a chiral smectic C phase liquid crystal. This disply device, shown diagrammatically in longitudinal section in FIG. 1, has a first linear polarizer 2 and a second linear polarizer 4, which are crossed and between which is inserted a tight display cell 6. A light source 8 below polarizer 4 makes it possible to illuminate cell 6. This display cell operating in transmission is formed from two generally glass transparent insulating walls 10, 12. These parallel walls are joined by their edges using a weld 14 as a sealing joint.

Walls 10 and 12 are respectively covered with an electrode 16 and a counterelectrode 18 with an appropriate shape for display purposes and made from a transparent conductive material. The electrode and counterelectrode are in each case more particularly formed from parallel conductive strips, the strips of the electrode and the strips of the counterelectrode crossing one another. Said electrode and counterelectrode make it possible to apply to the terminals of a liquid crystal film 20 with a chiral smectic C phase and contained in cell 6, a continuous electric field $\vec{E}$, whose direction or polarity can be changed. For this purpose electrode 16 and counterelectrode 18 are connected via an inverter 22 to a continuous power supply 24.

FIG. 2 shows on a molecular scale, the structure of a liquid crystal film with a smectic C phase, when the latter is contained in a display cell 6. With a view to simplifying FIG. 2, only the cell walls 10 and 12 are shown. The lower wall 12 e.g. constitutes a reference plane containing the two axes X and Y of an orthogonal reference system XYZ.

The smectic C liquid crystal film is formed from elongated molecules 26 having a longitudinal axis 28 and arranged in the form of layers 30. Each of these molecules has a permanent dipole moment $\vec{p}$ perpendicular to the longitudinal axis 28 thereof.

In the ideal case shown in FIG. 2, the smectic layers 30 are all parallel to one another and oriented perpendicularly to cell walls 10 and 12.

On applying an electric field $\vec{E}$ to such a liquid crystal, a high coupling is obtained between the molecular orientation (longitudinal axis 28 of the molecules) and said electric field $\vec{E}$ due to the presence of the permanent dipole. This coupling is of the polar type, because the electric dipole is preferably oriented in a direction parallel to the electric field. The polarity change of the electric field consequently makes it possible to change the orientation of the electric dipole and therefore the orientation of molecules 26.

FIG. 2 shows in continuous line form the molecules 26 of the liquid crystal according to a first orientation $A_1$ (state 1) forming an angle $-\theta$ with respect to direction X, the dipole moment $\vec{p}$ being oriented perpendicular to walls 10 and 12 of the cell and in direction 10–12 of electric field $\vec{E}$. The polarity change of the electric field makes it possible to switch dipole moments $\vec{p}$ into direction 12–10 leading to a pivoting of the molecules about axis Z by an angle of $2\theta$. The second orientation $A_2$ of the molecules (state 2) is symbolized in mixed line form. It forms an angle $+\theta$ with respect to direction X.

The molecules pass from the first to the second orientations and vice versa, whilst describing a cone angle at the apex of $2\theta$ characteristic of the material (typically $\theta - = 22.5°$).

FIG. 2 also shows the polarization directions P and P', respectively of rectilinear polarizers 2 and 4. When these two polarizers are crossed and when in state 1 the liquid crystal molecules 26 are parallel to polarization direction P' of polarizer 4, the optical state 1 of the liquid crystal corresponds to the absorbtion of the light from supply 8 and optical state 2 to the transmission of said same light.

The appropriately oriented chiral smectic C phase liquid crystals (FIG. 2) can thus be used as a display material. Apart from their bistability, they can have interesting properties, such as a rapid switching or response time of approximately 1 microsecond for small voltages applied to the electrodes (a few volts) and a wide electrooptical response.

Unfortunately, the presently known display devices using as the display material a chiral smectic (H or C) phase liquid crystal have a certain number of constructional problems mainly linked with the presence of the permanent dipole moment of the molecules.

Thus, in the absence of an electric field, the dipole moments of the liquid crystal molecules interact with the dipoles of cell walls 10 and 12 and possibly with those of the electrodes. In the case of two identical walls with a limited surface tension, this can lead to the helical arrangement of the molecules in each smectic layer 30, as shown in FIG. 3, the first molecule 26' of each smectic layer 30 oriented in accordance with $A_2$ and in contact with cell wall 10 and the last molecule $26_n$ of said same layers oriented in accordance with $A_1$ and in contact with cell wall 12 being displaced by an angle $2\theta$.

This orientation characterized by a twisting of the molecules in each smectic layer 30 is stable in the absence of the electric field. This liquid crystal has no memory effect, because a given orientation of the molecules (state 1 or 2), in the presence of an electric field, cannot be maintained on eliminating said field. This helical molecular configuration does not make it possible to produce display devices with an internal memory. Moreover, a homogeneous orientation of all the molecules of the liquid crystal is difficult to obtain for large display cells.

SUMMARY OF THE INVENTION

The present invention specifically relates to a ferroelectric liquid crystal display device making it possible to obviate the various disadvantages referred to hereinbefore. This device more particularly makes it possible to preserve the bistability of the display material in the absence of the electric field and to obtain a homogeneous orientation of the liquid crystal molecules compatible with a large number of liquid crystals on the one hand and with large display cells on the other.

More specifically, the invention relates to a liquid crystal display device incorporating a tight cell inserted between two crossed rectilinear polarizers, formed by a first and a second insulating wall, whereof at least one is transparent, said walls being respectively covered by a first and a second electrode of appropriate shape for the display and between which is inserted a ferroelectric smectic liquid crystal film, formed from parallel smectic layers, each constituted by chiral molecules having a longitudinal axis and a dipole moment oriented perpendicularly to said axis, the first and last molecules of each smectic layer being respectively located facing the first and second walls and means for producing between the first and second electrodes an electric field for orienting the dipole moment of the liquid crystal molecules, said device being characterized in that the first wall is coated with a first material liable to orient, independently of the direction of the electric field produced between the electrodes, the longitudinal axis of the molecules in a first direction forming an angel t with respect to a plane parallel to the walls and whose projection in said plane forms with a second direction contained in said plane a zero angle and in that the second wall is covered by a second material liable to orient the longitudinal axis of the molecules in a third direction parallel to said plane and whereof the projection in said plane forms with the second direction an angle close to $+\theta$ or $-\theta$ as a function of the direction of the electric field produced between the electrodes.

The greater the anchoring force of the cell walls, i.e. the greater the interaction of the cell walls with the dipole moments of the molecule, the longer the switching time from one optical state to the other of the molecules on changing the polarity of the electric field. However, this anchoring force of the cell walls, necessary for having a homogeneous orientation of the smectic layers of the liquid crystal, must be as small as possible in order to obtain rapid switching from one optical state to the other on changing the electric field direction. According to the invention, this compromise is brought about through the use of asymmetrical cell walls.

As the two walls of the cell are asymmetrical, it is possible to only use one of them for switching from one optical state to the other of the liquid crystal.

Thus, the first material ensuring a strong and tilted anchoring of the molecules on the first cell wall only gives them a single stable state out of the field, whereas the second material ensuring a slight anchoring of the molecules to the second cell wall makes it possible to pivot the molecules around the cone angle at the apex $\theta$ under the effect of an electric field.

The first material permits the homogeneous orientation of the smectic layers, which are parallel to one another and substantially perpendicular to the cell walls. Independently of the electric field direction, it ensures a tilted homeotropic alignment, i.e. angle t is such that $0 < t \leq \theta$ and is preferably $t \simeq \theta$.

The second material permits a planar orientation of the molecules, i.e. an orientation parallel to the walls of the cell, the dipole moments of said molecules then being perpendicular to said walls. It permits their switching from a state 1 to a state 2 in accordance with the electric field direction.

In order to obtain an adequate contrast of the display, the polarization of one of the two polarizers is advantageously parallel to the third direction. When the polarization direction of said polarizer forms an angle close to 0° with the third direction, the orientation of the molecules in said polarization direction corresponds to the absorbtion of light (black point) and the pivoting of the molecules by an angle $2\theta$ and modifying the direction of the electric field corresponds to the second optical state of the liquid crystal and to the transmission of light (bright point).

In order to favour the correct orientation of the molecules, the first material has an anisotropic surface in contact with the liquid crystal film.

According to the invention, the first material is made from any random material (e.g. polymer) ensuring a strong anchoring and a tilted homeotropic alignment of the liquid crstal molecules. Advantageously, the first material comprises a film of a long chain, substituted or unsubstituted organosilane, or a mixture of long chain organosilanes, possibly rubbed in order to ensure anisotropy. The long chain organosilanes usable in the invention have 1 to 2 silicon atoms and 11 to 30 carbon atoms. The substituents are in particular amine, alkoxy, fluorine, alkyl and epoxy groups.

Preferably the long chain organosilane is octadecyltriethoxysilane (ODS), dimethyl-octadecyl-aminopropylsilane (DMOAP) and mixtures thereof. These long chain organosilanes can be mixed with one or more short chain organosilanes having 1 to 2 silicon atoms and 1 to 10 carbon atoms, such as N-methyl-aminotrimethoxysilane (MAP) or dimethoxymethylchlorosilane.

Advantageously, said organosilane or said organosilanes are deposited on an optionally rubbed, polymeric layer or silica layer. According to the invention, the polymer must be able to form chemical bonds with the organosilanes used, i.e. must be able to adsorb the same. To this end, use is e.g. made of a polyimide which, through the presence of its oxygen atoms, can form Si-O bonds with the silanes. The same applies regarding silica. It is also possible to deposit the organosilane film on an optionally rubbed polymeric layer supported by a $SiO_2$ layer.

The second material can be on any material ensuring a weak, planar anchoring of the liquid crystal molecules. This second material is advantageously a polymeric film or a mineral film, such as silica, indium oxide or indium and tin oxide (ITO), optionally covered by a short chain organosilane of the type referred to hereinbefore or having a benzene, toluene, benzyl or vinyl group. A usable polymer can be constituted by polyamides, polyimides, polyvinyl alcohols and polybutylterephthalates. Preferably, the second material is a film of polyamide and in particular Nylon.

When use is made of an ITO layer as the first material, said layer can be appropriately etched for display purposes and then serves as the first electrode.

BRIEF DESCRIPTION OF THE DRAWING FIGURES

Other features and advantages of the invention can be gathered from the following description given in an illustrative and non-limitative manner with reference to the attached drawings, wherein show:

FIG. 1 already described, diagrammatically and in longitudinal section a prior art smectic liquid crystal display device.

FIG. 2 already described, diagrammatically the structure of a thin film chiral smectic C liquid crystal, as well as the possible orientations of the molecules of said liquid crystal, in accordance with the polarity of the electric field applied thereto.

FIG. 3 already described, the unfavourable orientation of the molecules of a liquid crystal film in a cell according to the prior art and in the absence of an electric field.

FIG. 4 diagrammatically and in longitudinal section, a display device according to the invention.

FIGS. 5a and 5b the two possible orientations of the molecules of a smectic C liquid crystal used in the device of FIG. 4 in accordance with the polarity of the electric field applied to the liquid crystal.

FIG. 6 diagrammatically a variant of the upper wall of the display cell illustrated in FIG. 4.

DETAILED DESCRIPTION OF THE PREFERRED EMBODIMENTS

Figure 1:
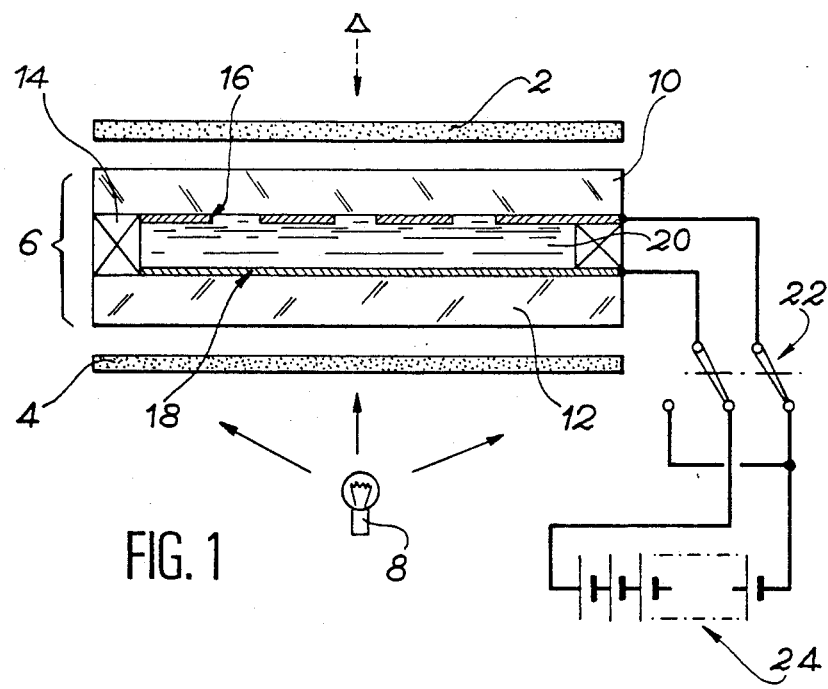
Figure 2:
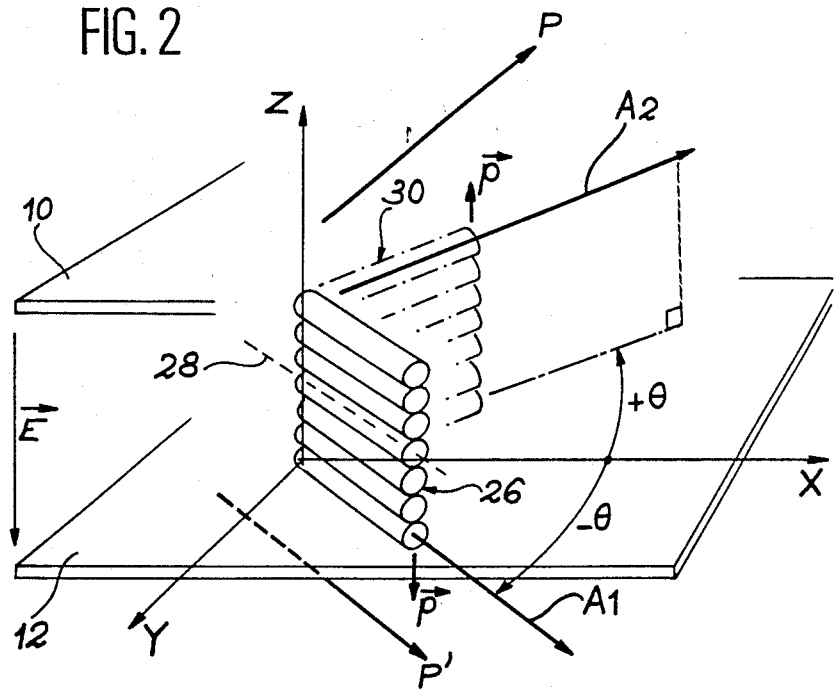
Figure 3:
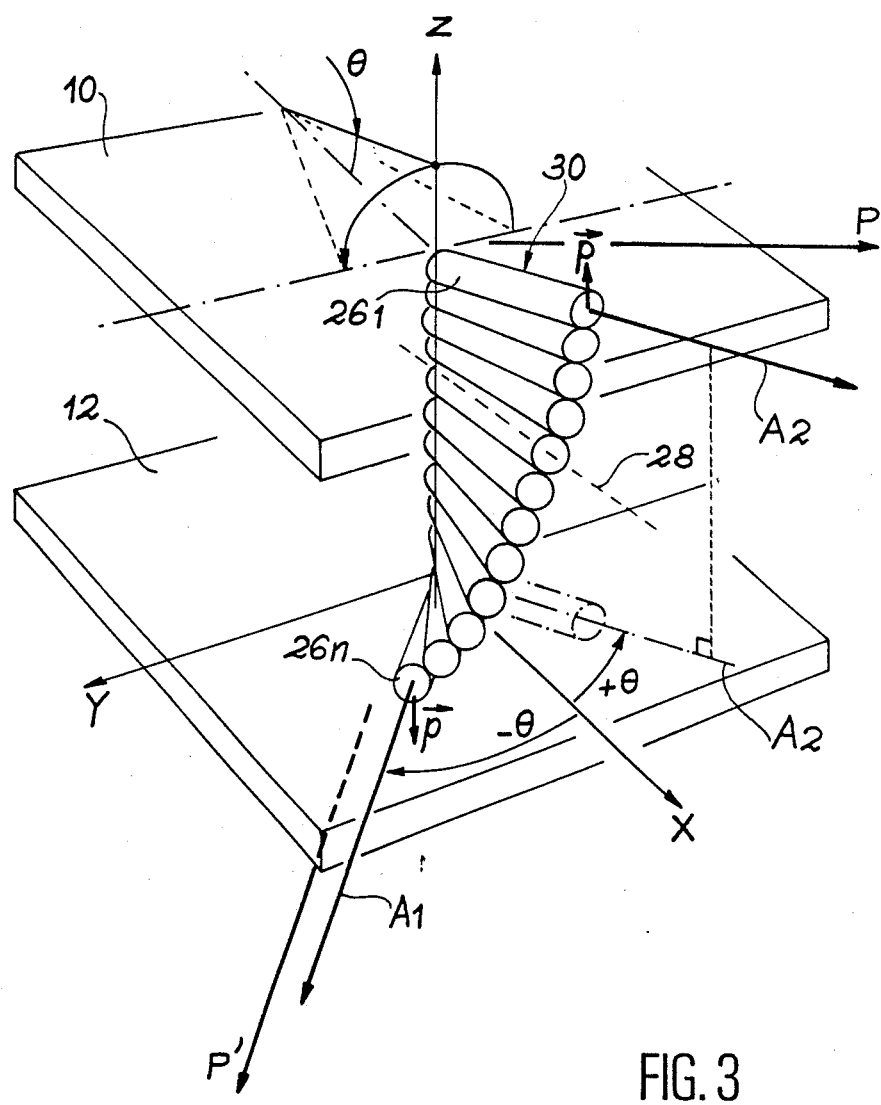
Figure 4:
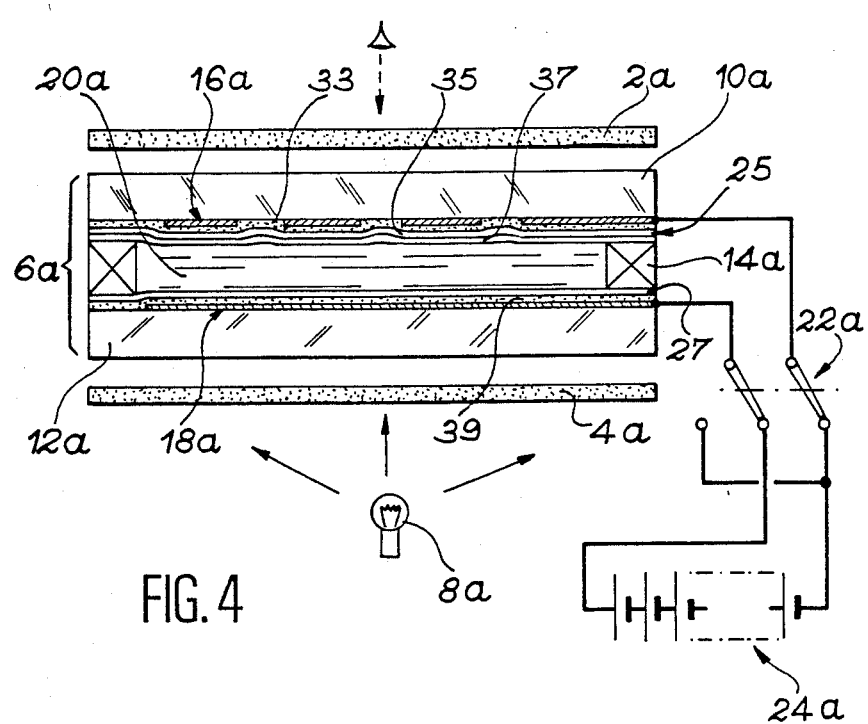

With reference to FIG. 4, the display device according to the invention comprises, like the prior art display devices, two crossed rectilinear polarizers 2a, 4a on either side of a display cell 6a illuminated by a lighting source 8a. Cell 6a has two insulating walls 10a, 12a, e.g. of glass, which are kept spaced from one another and welded by their edges using a weld 14a serving as a sealing joint.

Walls 10a and 12a are respectively provided with electrodes 16a and 18a, each electrode being in the form of parallel conductive strips and the conductive strips of electrode 16a are pendicular to those of electrode 18a. Each crossing of two conductive strips of respectively electrode 16a and electrode 18a defines an elementary display point. The conductive strips of these electrodes are in particular made from indium oxide or indium and tin oxide (ITO).

These electrodes are connected, via a switch 22a to an electric power supply 24a with a view to applying an electric field to the terminals of the liquid crystal film 20a contained in tight cell 6a and inserted between electrodes 16a and 18a.

According to the invention, the liquid crystal used is a smectic C liquid crystal having chiral molecules with ferroelectric properties and electrooptical properties, such as an electrically modifiable birefringence. In addition, the molecules have a permanent dipole moment.

At least at the operating temperature $T_1$ of display cell 6a, said liquid crystal has a chiral smectic C phase and at a temperature $T_2$ above the cell use temperature a smectic A phase and at a temperature $T_3$ above temperature $T_2$ an osotropic phase.

The cell is filled in conventional manner under vacuum, but at a temperature above $T_3$, in order to facilitate the filling of the cell. Thus, in the smectic phase, the liquid crystals used are relatively viscous, whereas in the isotropic phase they are very fluid.

Apart from the existence of a smectic phase A between the smectic phase C and the isotropic phase, the liquid crystals usable in the invention can have a nematic phase between the smectic A phase and the isotropic phase.

As an example of a liquid crystal usable in the invention, bivolume reference can be made to the following composition:

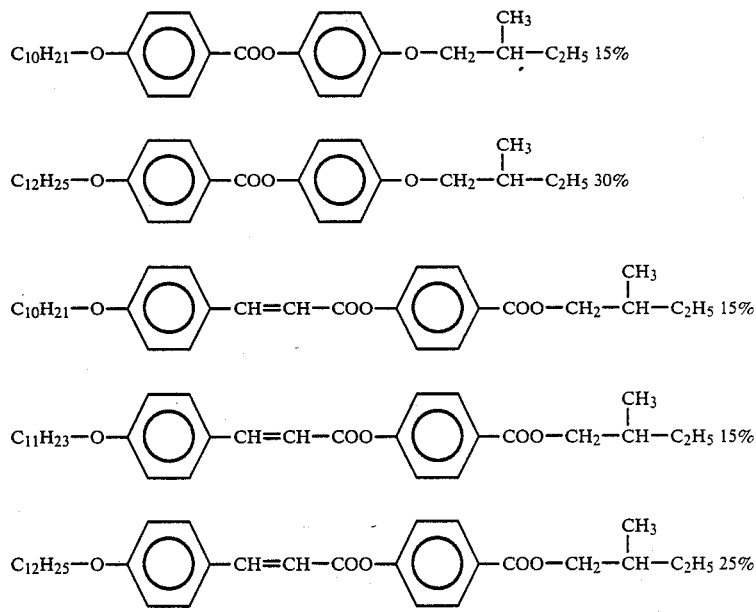

This ferroelectric liquid crystal has a chiral smectic C phase up to 50° C. and a smectic A phase up to 78° C., where it becomes isotropic. With such a liquid crystal, the filling of the cell can be carried out by heating the latter to 90° C. In order to obtain a good switching of all the liquid crystal molecules between the two optical states and with a good contrast and good memory effect, the inner surfaces of walls 10a and 12a are respectively provided with a first material 25 and a second material 27, which differ from one another, in contact with the liquid crystal film 20a.

Figure 5A:
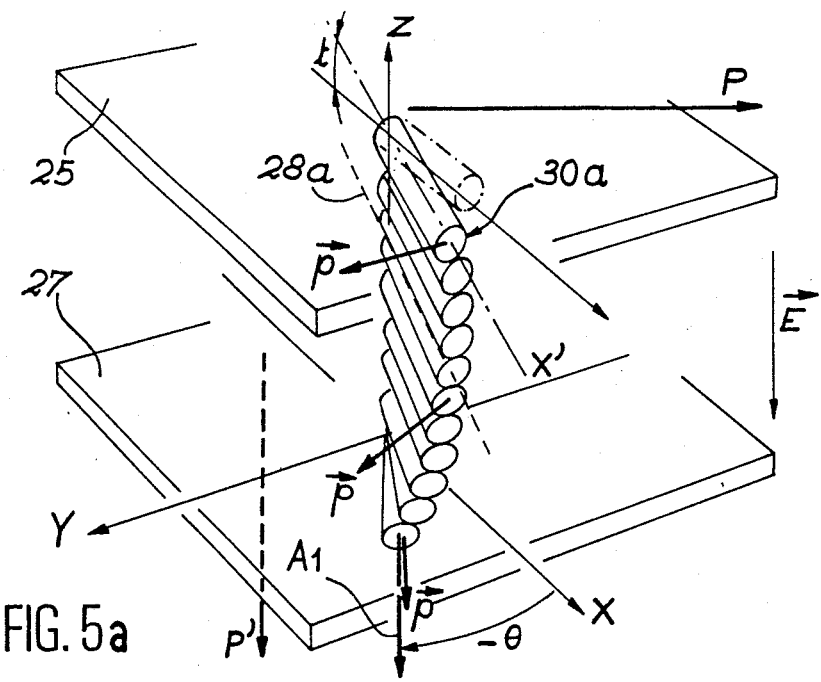
Figure 5B:
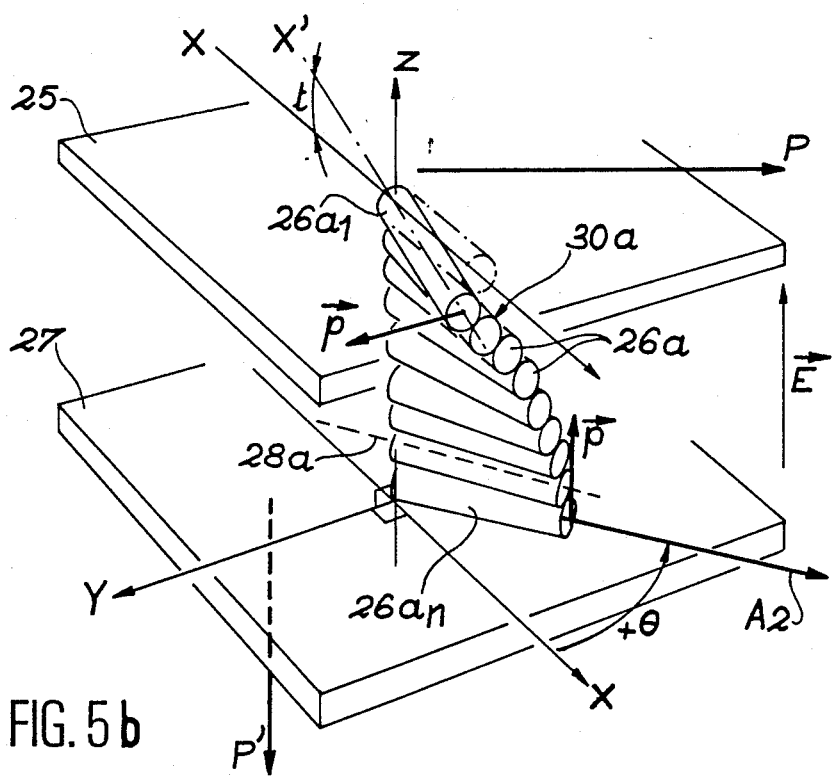

Material 25 serves to collectively orient the smectic layers 30a, parallel to one another and in direction Z perpendicular to the display cell walls 10a and 12a. As shown in FIGS. 5a and 5b, material 25 serves to limit, during the application of an electric field $\vec{E}$ between cell electrodes 16a and 18a, the pivoting of the liquid crystal molecules 26a about axis Z. Furthermore, said material 25 is used for orienting the longitudinal axis 20a of the molecules in a direction X' tilted with respect to the surface of material 25 and consequently with respect to the upper wall 10a of the cell and whose projection in plane XY is substantially parallel to direction X. Longitudinal axis 28a of the molecules forms an angle t with material 25, which is equal to or less than the angle $\theta$ characteristic of the liquid crystal used.

Material 25 also serves to orient the molecules of the liquid crystal, so that their dipole moment $\bar{p}$ is parallel to the surface of material 25 and consequently parallel to cell walls 10a and 12a.

Unlike material 25, material 27 ensures a weak, planar anchoring of the liquid crystal molecules 26a. It serves to orient molecules 26a in such a way that their longitudinal axis 28a is parallel to the surface of material 27 and consequently parallel to cell walls 10a and 12a and in such a way that the dipole moment p of the molecules are perpendicular to the surface of material 27 and consequently perpendicular to said walls.

Moreover, unlike in the case of material 25, material 27 permits a pivoting of the molecules about axis Z, on applying an electric field to the terminals of the liquid crystal film, the the pivoting angle being $2\theta$.

FIG. 5a shows the first possible orientation $A_1$ of the molecules in each smectic layer 30a following the application of an oriented electric field from material 25 to material 27 and FIG. 5b shows the second possible orientation $A_2$ of the molecules when the electric field direction has been reversed. Orientation $A_1$ forms an angle $-\theta$ relative to direction X and orientation $A_2$ an angle $+\theta$ relative to X. These two orientations are stable. The liquid crystal then has a memory effect.

Bearing in mind the different orientation properties of the materials 25 and 27 and their simultaneous action on the molecules of each smectic layer 30a, the angle between direction X' of the molecules and axis X increases continuously from material 25 to material 27 until equal to $\theta$. The tilt angle of molecules 26a with respect to walls 10a, 12a varies continuously from t to 0 from material 25 to material 27, t being characteristic of material 25.

In other words, only the final molecule $26a_n$ of each smectic layer, in direct contact with material 27, is oriented in plane XY, i.e. parallel to walls 10a and 12a and only the first molecule $26a_1$ of each smectic layer is oriented in direction X', whose projection in plane XY forms an angle close to 0° with axis X. Thus, in conclusion, the molecules in each smectic layer are oriented in accordance with a helical portion.

In the same way, the orientation of the dipole moments of the molecules of each smectic layer varies continuously from material 25, where they are parallel to the cell walls, to material 27, where they are perpendicular to said walls.

In order to obtain a good contrast between the two optical states of the liquid crystal, the polarization direction P' of polarizer 4a is oriented parallel to direction $A_1$ or $A_2$, whereas the polarization direction P of polarizer 2a is perpendicular to direction P'. When the polarization direction P' is oriented, as shown in FIGS. 5a and 5b, the first optical state $A_1$ corresponds to the absorbtion of the light from source 8a and the second optical state $A_2$ corresponds to the transmission of said same light. In other words, the first optical state corresponds to a black display and the second optical state to a white display.

Various examples for producing the materials 25 and 27 of the cell according to the invention will now be given.

EXAMPLE 1

With reference to FIG. 4, the material disposed on the inner surface of an ITO electrode 16a is successively formed by an approximately 75 nanometer thick silica layer 33, an approximately 75 nanometer thick rubbed polyimide layer 35 and a rubbed DMOAP film 37 in direct contact with the liquid crystal film 20a. DMOAP deposition is ensured by immersing wall 10a, provided with its electrodes and silica and polyimide layers, in a DMOAP solution.

In this example, the vapour phase deposited silica layer 33 has an electrical function during the application of the electrical field for controlling the liquid crystal, whilst contributing with the polyimide layer and the DMOAP film to the appropriate orientation of the molecules, as shown in FIGS. 5a and 5b.

Material 27 is formed by a 150 nanometer thick film of Nylon 6. This film 27 of Nylon 6 in contact with the liquid crystal film 20a is supported by a 75 nanometer thick silica layer 39 solely used for its dielectric properties during the control of the display device.

The liquid crystal 20a used is in particular that described hereinbefore. It switches from state 1 (FIG. 5a) to state 2 (FIG. 5b), with storage, when a potential difference of 7 volts is applied for 1 millisecond between electrodes 16a and 18a.

EXAMPLE 2

In this example, material 25 differs from that of example 1 through the use of a film 37 of a mixture of rubbed organosilanes containing MAP and ODS with a MAP/ODS volume ratio of 3. Layers 33, 35 and 27 are identical to those of example 1.

EXAMPLE 3

Figure 6:
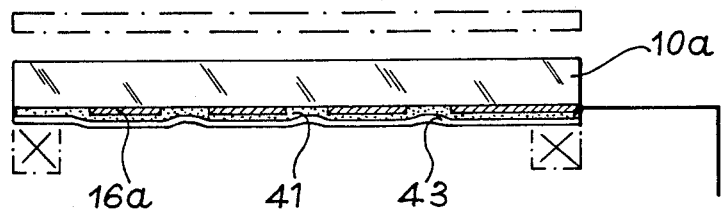

With reference to FIG. 6, the material 25a covering the electrode 16a of the display cell is constituted by a 75 nanometer thick vapour phase deposited silica layer 41 covered by a rubbed DMOAP film 43. Material 27 associated with said material 25a is a film of Nylon 6.6.

EXAMPLE 4

This example differs from example 1 through the use of a film 37 of a mixture of organosilanes containing MAP and DMOAP in a MAP/DMOAP volume ratio of 3, layers 33 and 35 being the same as those in example 1. Material 27 is a film of Nylon 6.

EXAMPLE 5

This example differs from example 3 through the use of a silica layer 41 having on its surface a plurality of oblique notches covered with a DMOAP film 43. This 75 nm thick layer 41 is deposited by vacuum evaporation, as described in FR-A-8417794. As a result of its anisotropy, it ensures a large tilt angle t of the liquid crystal molecules, which are in contact with its surface. Material 27 is then a non-rubbed film of Nylon 6.

EXAMPLE 6

In this example, material 27 is solely constituted by a 10 nm thick gold film, etched in the form of parallel strips, which in coincidence cover the conductive strips of electrode 16a. Material 25 is identical to that described in example 1.

The above description has clearly been given solely in an illustrative manner and modifications can be made thereto without passing beyond the scope of the invention.

We claim:

1. Liquid crystal display device incorporating A tight cell inserted between two crossed rectilinear polarizers and comprising first and second insulating walls, whereof at least one is transparent, said walls being respectively coated by first and second electrodes with an appropriate shape for the display and between which is inserted a ferroelectric smectic liquid crystal film having parallel smectic layers and each constituted by chiral molecules having a longitudinal axis and a dipole moment perpendicular to said axis, the first and second molecules of each smectic layer being respectively positioned facing the first and the second walls and means for producing between the first and second electrodes an electric field for orienting the dipole moment of the liqud crystal molecules, said device being characterized in that the first wall is covered by a first material able to orient, independently of the direction of the electrical field produced between the electrodes, the longitudinal axis of said molecules in a first direction forming an angle t with $0 < t \leq \theta$ and with respect to a plane parallel to the walls and whose projection in said plane forms with a second direction contained in said plane an angle near to 0°, said first material comprising a film of a mixture of a long chain organosilane and a short chain organosilane in contact with the crystal film, said organosilanes being substituted or unsubstituted, and in that the second wall is covered with a second material able to orient the longitudinal axis of the molecules in a third direction parallel to said plane and whose projection in said plane forms with the second direction an angle near $+\theta$ or $-\theta$, with respect to the direction of the electric field produced between electrodes.

2. Display device according to claim 1, characterized in that the polarization direction (P') of one of the two polarizers is parallel to the third direction ($A_1$).

3. Display device according to claim 1, characterized in that the organosilane film is rubbed.

4. Display device according to claim 1, characterized in that the organosilane film is deposited on a silica layer and/or an optionally rubbed polymer layer able to form chemical bonds with the organosilane.

5. Display device according to claim 4, characterized in that the polymer is a polyimide.

6. Display device according to claim 1, characterized in that the long chain organosilane is chosen from the group consisting of octadecyl-triethoxysilane (ODS), dimethyl-octadecyl-aminopropylsilane (DMOAP) and their mixtures.

7. Display device according to claim 1, characterized in that the second material is a film of a material chosen from the group consisting of a polymer, silica, indium oxide, gold and indium and tin oxide optionally covered by a film of at least one short chain organosilane.

8. Display device according to claim 1, characterized in that the second material is a polyamide.

9. Display device according to claim 1, characterized in that the second material (27) is Nylon.

10. Display device according to claim 1, characterized in that the short chain organosilane is N-methyl-aminotrimethoxysilane (MAP).

11. Display device according to claim 1, characterized in that the liquid crystal comprises a chiral smectic C phase at the operating temperature $T_1$ of cell ($6a$), a smectic A phase at temperature $T_2 > T_1$ and an isotropic phase at temperature $T_3 > T_2$.

12. Display device according to claim 1, characterized in that the second material is gold.

13. Liquid crystal display device incorporating a tight cell inserted between two crossed rectilinear polarizers and comprising first and second insulating walls, whereof at least one is transparent, said walls being respectively coated by a first and a second electrodes with an appropriate shape for the display and between which is inserted a ferroelectric smectic liquid crystal film having parallel smectic layers and each constituted by chiral molecules having a longitudinal axis and a dipole moment perpendicular to said axis, the first and second molecules of each smectic layer being repsectively positioned facing the first and the second walls and means for producing between the first and second electrodes an electric field for orienting the dipole moment of the liquid crystal molecules, said device being characterized in that the first wall is covered by a first material able to orient, independently of the direction of the electrical field produced between the electrodes, the longitudinal axis of said molecules in a first direction forming an angle t with $0 < t \leq \theta$ and with respect to a plane parallel to the walls and whose projection in said plane forms with a second direction contained in said plane an angle near to 0°, said first material comprising a film of at least one, substituted or unsubstituted long chain organosilane in contact with the liquid crystal film and deposited on a silica layer and/or optionally rubbed polymer layer able to form chemical bonds with the organosilane, and in that the second wall is covered with a second material able to orient the longitudinal axis of the molecules in a third direction parallel to said plane and whose projection in said plane forms with the second direction an angle near to $+\theta$ or $-\theta$, with respect to the direction of the electric field produced between electrodes.

14. Display device according to claim 13, characterized in that the polarization direction of one of the two polarizers is parallel to the third direction.

15. Display device according to claim 13, characterized in that said long chain organosilane is rubbed.

16. Display device according to claim 13, characterized in that the polymer is a polyimide.

17. Display device according to claim 13, characterized in that the long chain organosilane is chosen from the group consisting of octadecyl-triethoxylsilane (ODS), dimethyl-octadecyl-aminopropylsilane (DMOAP) and their mixtures.

18. Display device according to claim 13, characterized in that the second material is a film of a material chosen from the group consisting of a polymer, silica, indium oxide, gold and indium and tin oxide optionally covered by a film of at least one short chain organosilane.

19. Display device according to claim 13, characterized in that the second material is polyamide.

20. Display device according to claim 13, characterized in that the second material is Nylon.

21. Display device according to claim 13, characterized in that the second material is gold.

22. Display device according to claim 13, characterized in that the liquid crystal comprises a chiral smectic C phase at the operating temperature $T_1$ of the cell, a smectic A phase at temperature $T_2 > T_1$ and an isotropic phase at temperature $T_3 > T_2$.

23. Liquid crystal display device incorporating a tight cell inserted between two crossed rectilinear polarizers and comprising first and second insulating walls, whereof at least one is transparent, said walls being respectively coated by first and second electrodes with an appropriate shape for the display and between which is inserted a ferroelectric smectic liquid crystal film having parallel smectic layers and each constituted by chiral molecules having a longitudinal axis and a dipole moment perpendicular to said axis, the first and second molecules of each smectic layer being respectively positioned facing the first and the second walls and means for producing between the first and second electrodes an electric field for orienting the dipole moment of the liquid crystal molecules, said device being characterized in that the first wall is covered by a first material able to orient, independently of the direction of the electrical field produced between the electrodes, the longitudinal axis of said molecules in a first direction forming an angle t with $0 < t \leq \theta$ and with respect to a plane parallel to the walls and whose projection in said plane forms with a second direction contained in said plane an angle near to 0°, said first material comprising a film of at least one, optionally rubbed, long chain organosilane in contact with the liquid crystal film chosen from the group consisting of octadecyl-triethoxysilane (ODS), dimethyl-octadecyl-aminopropylsilane (DMOAP) and their mixtures, and in that the second wall is covered with a second material able to orient the longitudinal axis of the molecules in a third direction parallel to said plane and whose projection in said plane forms with the second direction an angle near to $+\theta$ or $-\theta$, with respect to the direction of the electric field produced between electrodes.

24. Display device according to claim 23, characterized in that the polarization direction of one of the two polarizers is parallel to the third direction.

25. Display device according to claim 23, characterized in that the second material is a film of a material chosen from the group consisting of a polymer, silica, indium oxide, gold and indium and tin oxide optionally covered by a film of at least one short chain organosilane.

26. Display device according to claim 23, characterized in that the second material is polyamide.

27. Display device according to claim 23, characterized in that the second material is Nylon.

28. Display device according to claim 23, characterized in that the second material is gold.

29. Display device according to claim 23, characterized in that the liquid crystal comprises a chiral smectic C phase at the operating temperature $T_1$ of the cell, a smectic A phse at temperature $T_2 > T_1$ and an isotropic phase at temperature $T_3 > T_2$.

30. Liquid crystal display device incorporating a tight cell inserted between two crossed rectilinear polarizers and comprising first and second insulating walls, whereof at least one is transparent, said walls being respectively coated by first and second electrodes with an appropriate shape for the display and between which is inserted a ferroelectric smectic liquid crystal film having parallel smectic layers and each constituted by chiral molecules having a longitudinal axis and a dipole moment perpendicular to said axis, the first and second molecules of each smectic layer being respectively positioned facing the first and the second walls and means for producing between the first and second electrodes an electric field for orienting the dipole moment of the liquid crystal molecules, said device being characterized in that the first wall is covered by a first material able to orient, independently of the direction of the electrical field produced between the electrodes, the longitudinal axis of said molecules in a first direction forming an angle t with respect to a plane parallel to the walls and whose projection in said plane forms with a second direction contained in said plane an angle near to 0°, and in that the second wall is covered with a second material able to orient the longitudinal axis of the molecules in a third direction parallel to said plane and whose projection in said plane forms with the second direction an angle near to $+\theta$ or $-\theta$, with respect to the direction of the electric field produced between electrodes, said second material being chosen from the group consisting of polyamide and gold.

31. Display device according to claim 30, characterized in that the second material is Nylon.

32. Display device according to claim 30, characterized in that the angle t is such that $0 < t \leq \theta$.

33. Display device according to claim 30, characterized in that the polarization direction of one of the two polarizers is parallel to the third direction.

34. Display device according to claim 30, characterized in that the first material has an anisotropic surface in contact with the liquid crystal film.

35. Display device according to claim 30, characterized in that the first material comprises a film of at least one optionally rubbed, substituted or unsubstituted long chain organosilane in contact with the liquid crystal film.

36. Display device according to claim 30, characterized in that the liquid crystal comprises a chiral smectic C phase at the operating temperature $T_1$ of the cell, a smectic A phase at temperature $T_2 > T_1$ and an isotropic phase at temperature $T_3 > T_2$.

* * * * *